United States Patent [19]

Smith

[11] Patent Number: 5,305,136
[45] Date of Patent: Apr. 19, 1994

[54] OPTICALLY BIDIRECTIONAL FAST OPTICAL SWITCH HAVING REDUCED LIGHT LOSS

[75] Inventor: Malcolm C. Smith, Holliston, Mass.

[73] Assignee: Geo-Centers, Inc., Newton Centre, Mass.

[21] Appl. No.: 860,700

[22] Filed: Mar. 31, 1992

[51] Int. Cl.$^5$ .................................... G02F 1/035
[52] U.S. Cl. .................................... 359/247; 359/250; 359/256; 359/259; 359/322; 385/8; 385/20
[58] Field of Search ............... 359/246, 247, 250, 256, 359/259, 322; 385/8, 9, 20, 21, 22

[56] References Cited

U.S. PATENT DOCUMENTS

| | | | |
|---|---|---|---|
| Re. 28,971 | 9/1976 | Kumada et al. | |
| 2,768,557 | 10/1956 | Bond. | |
| 3,239,671 | 3/1966 | Buhrer | 359/259 |
| 3,383,460 | 5/1968 | Pritchard | 359/250 |
| 3,393,955 | 7/1968 | Sterzer | 359/247 |
| 3,481,661 | 12/1969 | Harris. | |
| 3,495,892 | 2/1970 | Dailey | 359/259 |
| 3,536,375 | 10/1970 | Mansell. | |
| 3,684,350 | 8/1972 | Wentz | 359/256 |
| 3,719,414 | 3/1973 | Wentz | 359/256 |
| 3,838,906 | 10/1974 | Kumada | 359/322 |
| 3,923,379 | 12/1975 | Kumada | 359/322 |
| 3,936,146 | 2/1976 | Kumada et al. | 359/259 |
| 4,269,483 | 5/1981 | Feldtkeller. | |
| 4,335,939 | 6/1982 | Stovell et al. | 359/259 |
| 4,343,536 | 8/1982 | Watanabee et al. | |
| 4,403,352 | 10/1983 | Huignard et al. | 455/601 |
| 4,465,969 | 8/1984 | Tada et al. | 324/96 |
| 4,504,121 | 3/1985 | Carlsen et al. | |
| 4,554,449 | 11/1985 | Taniuchi et al. | 250/227 |
| 4,563,093 | 1/1986 | Tada et al. | 356/368 |
| 4,595,876 | 6/1986 | Kuhara et al. | 324/96 |
| 4,631,402 | 12/1986 | Nagatsuma et al. | 250/231 |
| 4,694,243 | 9/1987 | Miller et al. | |
| 4,698,497 | 10/1987 | Miller et al. | 250/231 |
| 4,699,472 | 10/1987 | Dunn | 359/259 |
| 4,734,576 | 3/1988 | Agoston et al. | 250/225 |
| 4,784,473 | 11/1988 | Gookin. | |
| 4,919,522 | 4/1990 | Nelson. | |
| 5,090,824 | 2/1992 | Nelson et al. | 385/22 |
| 5,109,189 | 4/1992 | Smith | 324/96 |

FOREIGN PATENT DOCUMENTS

| | | | |
|---|---|---|---|
| 748654 | 10/1966 | Canada | 88/117 |
| 61-38926 | 2/1986 | Japan | 359/250 |

OTHER PUBLICATIONS

"Final Technical Report, Fast Optical Switch for Multimode Fiber Optic Based Control Systems, Phase I." Prepared by Geo-Centers, Inc., under Contract No. NAS-25615, Aug., 1989.

"Non-Invasive Electro-Magnetic Field Sensor," Nelson et al., AFWAL-TR-86-3051, Final Report, AF Wright Aeronautical Laboratories, Jan., 1986.

"A Fibre Optic Electric Field Sensor Using the Electrooptic Effect $Bi_4Ge_3O_{12}$," K. Shibata, Published by IEE, Given at the First International Conference on Optical Fibre Sensors, Apr. 26, 1983.

"Electro-Optic Effect Of Zincblende," S. Namba, Journal of the Optical Society of American, vol. 51, No. 1, pp. 148-151, Jan. 1961.

*Primary Examiner*—Martin Lerner
*Attorney, Agent, or Firm*—Wolf, Greenfield & Sacks

[57] ABSTRACT

An optically bidirectional electrically controlled optical switch having reduced light loss includes an electro-optic crystal having one set of fast and slow optical axes and having at least two light paths for receiving light beams through the crystal, the crystal exhibiting electric field induced birefringence such that a light beam passing through the crystal along a light path and having a plane of polarization oriented in a first direction may have its plane of polarization switched from the first direction to a plane of polarization oriented in a second direction. Beam splitting polarizers are disposed at each end of the electro-optic crystal and optically aligned with the two light paths. The beam splitting polarizers split the optical beam into two light beams having planes of polarization oriented in the first and second directions when transmitting light to the two light paths and combine the two light beams into a single light beam when receiving light beams from the two light paths. Substantially 100% of the unpolarized light input to the optical switch is transferred to the output due to the use of the beam splitting polarizers. In a preferred embodiment of the invention, the electro-optic crystal is a cubic crystal chosen from crystal classes $\overline{4}3\,m$, $\overline{4}2m$, or 23.

11 Claims, 7 Drawing Sheets

OPTICALLY BIDIRECTIONAL FAST OPTICAL SWITCH HAVING REDUCED LIGHT LOSS

BACKGROUND OF THE INVENTION

1. Field of the Invention

The present invention relates generally to the field of transmission and control of optical signals. More particularly, the invention pertains to an electrically controlled apparatus for high speed switching of optical signals. The switching apparatus is especially suitable for applications where the optical signals are transmitted by single mode or multimode optical fibers.

2. Discussion of the Related Art

Until recently, fast optical switching for multimode fiber optic communication and sensor networks was not available. Prior art opto-mechanical switches are known in which the free end of an optical fiber is movable from one contact to another. At each contact, the movable end is aligned with the fixed end of another optical fiber. Such opto-mechanical switches operate at slow speeds (on the order of a few milliseconds) which severely limits their utility. Moreover, repeated flexing of the movable free end of the optical fiber tends to induce fatigue and ultimately results in breakage of the fiber.

By contrast, a fully optical switch (i.e., a switch which uses optical principles for switching as opposed to mechanical principles) is not subject to fatigue and breakage and can operate at much faster speeds.

Optical switches have other advantages as well. For example, in environments where electronically switched systems have proved to be unreliable due to electromagnetic interference, systems which use optical switches are able to operate reliably because the optical signals transmitted along the optical fibers are not subject to electromagnetic interference. Moreover, optical switches are more directly compatible with optical fiber networks than electronic switches because optical fibers can be directly connected to optical switches without requiring converters to change between optical signals and electrical signals.

One example of a recently developed, fully optical switch may be seen in U.S. Pat. No. 4,919,522 to Nelson, granted Apr. 24, 1990, and assigned to the same assignee as the present invention, the specification of which is incorporated herein by reference (hereinafter the '522 optical switch). The '522 optical switch uses an electro-optic crystal of the kind having two independent sets of fast and slow optical axes in the crystal. One set of fast and slow optical axes is sensitive to a first electric field extending through the crystal in one direction along a crystal direction and the other set of fast and slow optical axes is angularly disposed with respect to the first set and is sensitive to a second electric field extending through the crystal in a direction orthogonal to the first electric field.

That '522 optical switch also uses a rectangular parallelepiped crystal with electrodes formed on the four opposing sides of the crystal. The activation of one opposed pair of electrodes causes light to pass through one set of optical axes, while activation of the other pair of opposed electrodes causes light to pass exclusively through the other set of optical axes in the crystal.

Although the '522 optical switch operates well as a fast optical switch, it requires a crystal having two sets of well-defined fast and slow optical axes in the crystal or two separate crystals each having a single light path wherein the two light paths must be synchronously switched to achieve a single pole, double-throw switch. Additionally, although the '522 optical switch is optically reversible (or bidirectional), meaning that the switch inputs and outputs can be reversed and the switch will still function properly, the switch has an inherent loss of one-half of the input light intensity due to the polarizing optics required. This insertion loss reduces the overall light transmission through the switch which decreases the number of switches that may be cascaded in a system.

Another example of a recently developed, fully optical switch may be seen in U.S. Pat. No. 5,090,824 to Nelson et al., granted Feb. 25, 1992, and assigned to the same assignee as the present invention, the specification of which is incorporated herein by reference (hereinafter the '824 optical switch). The '824 optical switch achieves a single-pole, single-throw optical switch using a crystal having one set of fast and slow optical axes, one pair of electrodes, one optical path through the crystal, and one set of polarizing optics for beam switching. The '824 switch thus achieves the same result as the '522 optical switch, but uses a single optical path in combination with different polarizing optics that operate in a manner different from the '522 optics resulting in a more compact, less complex switch construction compared to the '522 optical switch.

The '824 optical switch includes a single beam splitting polarizer which detects the change in polarization of a light beam passing through the electro-optic crystal in response to an electric field created in the electro-optic crystal by activation of the pair of electrodes. The beam splitting polarizer transmits light beams received from the electro-optic crystal and having different planes of polarization in different directions. In the '824 optical switch, polarization control optics including a beam splitting polarizer, a right angle prism, and a polarization rotator are used at the input to the electro-optic crystal to reduce the inherent light loss of the switch.

Although the '824 optical switch operates well as a fast optical switch, it requires complex optics to reduce the light loss of the switch. Additionally, the switch is not optically reversible if the polarization control optics are used. If the polarization control optics are not used, then the '824 optical switch would be optically reversible, but would suffer the same loss of one half of the input light intensity as with the '522 switch.

SUMMARY OF THE INVENTION

The disadvantages of the prior art are overcome by the present invention which provides an optically bidirectional electrically controlled optical switch including at least one electro-optic crystal means having one set of fast and slow optical axes for receiving light beams and having at least two light paths through the crystal means and exhibiting electric field induced birefringence such that a light beam passing through the crystal means along a light path and having a plane of polarization oriented along a first direction may have its plane of polarization switched from the first direction to a plane of polarization oriented along a second direction. Light directing means, which in a preferred embodiment include beam splitting polarizers, are disposed at each end of the electro-optic crystal and optically aligned with the two light paths. The light beam directing means split a single beam of light into two light beams having planes of polarization oriented along the first and second directions when transmitting light to the two light paths and combine two light beams having planes of polarization oriented along the first and second directions into a single light beam when receiving light beams from the two light paths. The light beam directing means direct a portion of an incident light beam having a plane of polarization oriented along the first direction along one of the at least two light paths through the crystal means and direct a portion of the incident light beam having a plane of polarization oriented along the second direction along the other one of the at least two light paths through the crystal means. When receiving light beams from the electro-optic crystal, the light beam directing means transmit a light beam having a plane of polarization oriented along the first direction differently from a light beam having a plane of polarization oriented along the second direction. The beam splitting polarizers transmit light having a plane of polarization oriented along the first direction through the beam splitting polarizer without altering a course of the light, and change the course of light having a plane of polarization oriented along a second direction.

In a preferred embodiment of the invention, the electro-optic crystal is a cubic crystal chosen from crystal classes $\bar{4}3m$, $\bar{4}2m$, or 23. Also in a preferred embodiment of the invention, the fast and slow optical axes are orthogonal to each other and the first and second directions are orthogonal to each other. Right angle prisms may be added to the basic switch construction to reduce the size of the physical switch.

The present invention provides a reversible optical switch in which substantially all of the input light intensity is transmitted through the optical switch to reduce the inherent light loss of the switch and to increase the number of switches that may be cascaded. By appropriate selection of components, the present invention can be used to provide a single-pole, single-throw switch, a single-pole double-throw switch, and a double-pole, double-throw switch.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein by reference and in which like elements have been given like reference characters, FIG. 1 schematically depicts a plan view of an optical switch of the present invention.

DETAILED DESCRIPTION

For purposes of illustration only and not to limit generally, the present invention will be explained with reference to its use in a fast optical switch wherein the electro-optic crystal is a bismuth germanium oxide (BGO) or bismuth silicon oxide (BSO) crystal. However, one skilled in the art will appreciate that any electro-optic crystal having no natural birefringence along a given light propagation direction and at least one set of well-defined fast and slow optical axes may be used in the present invention. Additionally, although a particular orientation of the optical components used in the switch will be explained in detail, one skilled in the art will appreciate that the orientations of the various optical components may be changed but will still embody the principles of the present invention.

Figure 1:
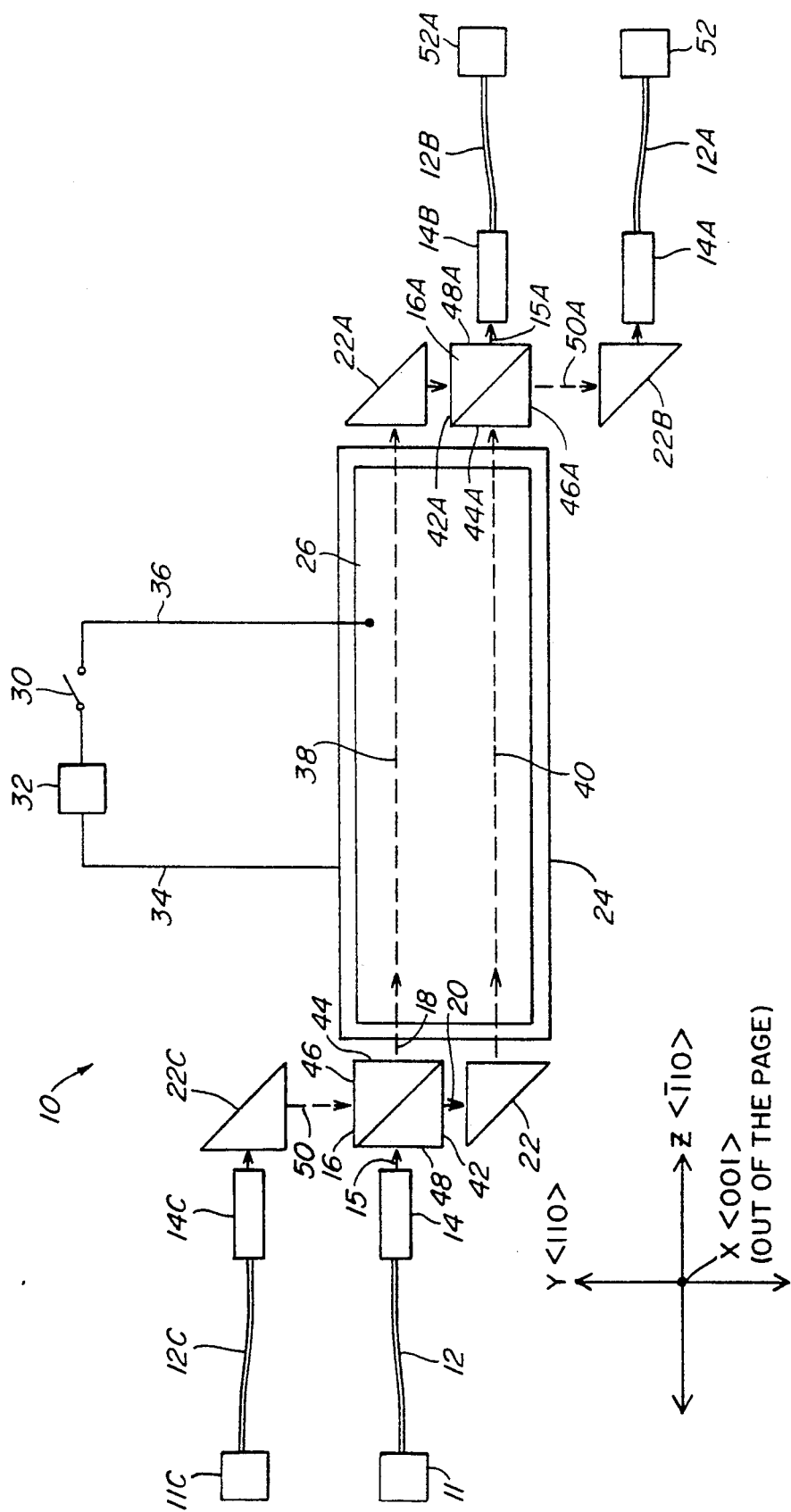
FIG. 1A schematically depicts an alternate embodiment of the electro-optic switch of the present invention illustrated in FIG. 1.
Figure 2:
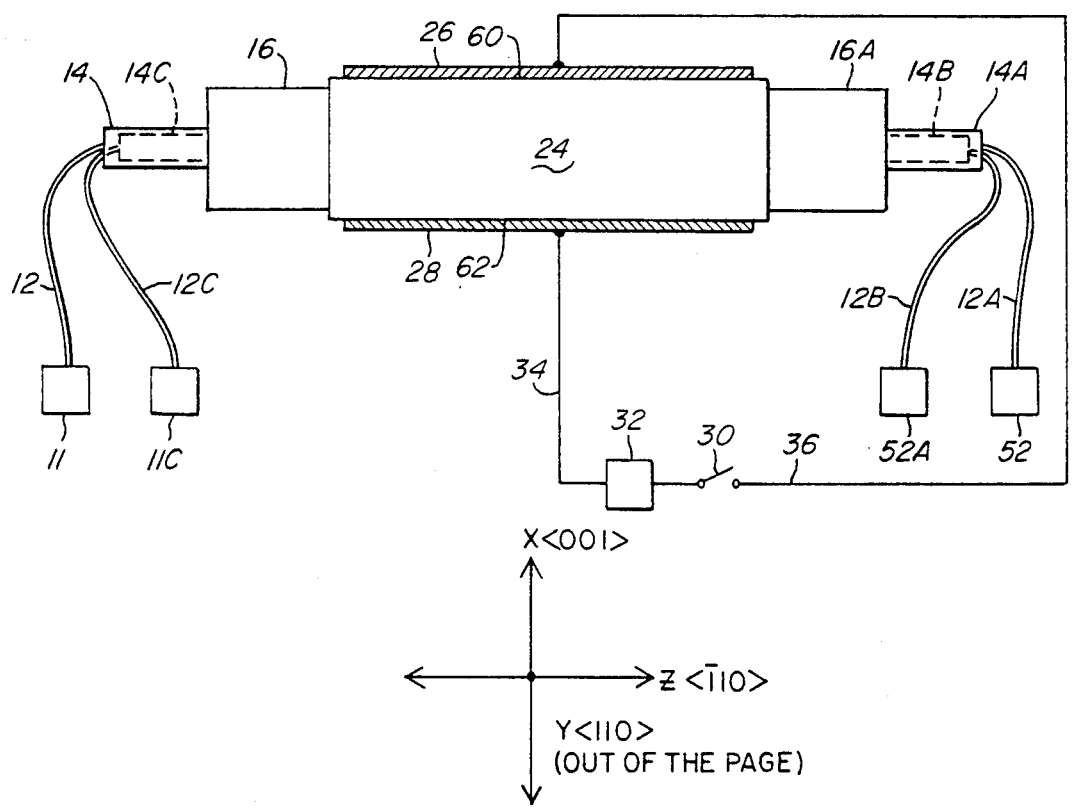
FIG. 2 schematically depicts a side view of the optical switch of FIGS. 1 and 1A.

Reference is now made to FIGS. 1 and 2, which illustrate the basic arrangement of a bidirectional, fast optical switch 10 having reduced light loss of the present invention. The switch illustrated in FIGS. 1 and 2 has an activation time of less than one microsecond. The switch 10 uses light provided by optical source 11 or 11C, which light is preferably of a single wavelength or of a narrow spectrum, such as that from a light-emitting diode (LED) or the like. Optical source 11 or 11C may also be a laser of the type that emits light that is principally of one wavelength. However, the light emitted by optical source 11 can be incoherent, and as noted light produced by an LED may be used.

The light from optical source 11 is transmitted along an optical fiber 12 to a collimating means 14. Collimating means 14 may be any type of collimating lens such as a grin-rod (graded-index) lens available under the tradename SELFOC ® or a single or compound refractive lens. Light beam 15 emerging from collimating means 14 is a collimated, randomly polarized light beam that is transmitted to a light-directing means 16. Light-directing means 16, in a preferred embodiment, is a beam splitting polarizer. More specifically, the beam splitting polarizer may be a Glan-Taylor prism. Light beam 15 is incident on face 48 of beam splitting polarizer 16. Two light beams 18 and 20 respectively emerging from faces 44 and 42 of beam splitting polarizer 16 have respective planes of polarization that are orthogonal to each other. For example, in the particular embodiment illustrated in FIG. 1, light beam 18 emerges from face 44 of beam splitting polarizer 16 with its plane of polarization oriented along the Y-axis in the X-Y plane. Light beam 20 emerges from face 42 of beam splitting polarizer 16 having its plane of polarization oriented along the X-axis in the X-Z plane. Light beams 18 and 20 are transmitted to an electro-optic crystal 24. Light beam 20 is transmitted to a reflecting element 22, which may be a right angle prism which reflects light beam 20 towards electro-optic crystal 24 without altering its plane of polarization.

Electro-optic crystal 24 is a crystal having at least one well-defined set of fast and slow optical axes in the crystal. In a preferred embodiment of the invention, electro-optic crystal 24 is a rectangular parallelepiped cubic crystal chosen from crystal classes $\bar{4}3m$, $\bar{4}2m$, or 23. Electro-optic crystal 24 may be a bismuth germanium oxide crystal or bismuth silicon oxide crystal. In a preferred embodiment, crystal 24 is a BGO crystal such as bismuth orthosilicate or bismuth orthogermanate.

A pair of electrodes 26 and 28 are disposed on two opposite sides 60 and 62 of electro-optic crystal 24. When a switch 30 is closed, a voltage from a voltage generator 32 is transmitted to electrodes 26 and 28 via respective connections 36 and 34. Consequently, an electric field is impressed across electro-optic crystal 24 between electrodes 26 and 28.

As will be explained in greater detail hereinafter, electro-optic crystal 24 has, in a preferred embodiment, one set of fast and slow optical axes. The fast and slow optical axes are respectively oriented, for electric fields in the <001> crystal direction, at $\pi/4$ (i.e., 45°) with respect to the <001> crystal direction, which corresponds to the X-axis in FIGS. 1–4. The electric field generated by electrodes 26 and 28 and parallel to the X-axis, as will be explained in greater detail hereinafter, is used to switch the respective planes of polarization of light beams 18 and 20 between the X and Y axes as they pass through electro-optic crystal 24 along respective light paths 38 and 40.

Light beam 18 emerging from electro-optic crystal 24 is reflected by right angle prism 22A into a face 42A of a second light-directing means 16A. Right angle prism 22A and light-directing means 16A may be the same type of devices as right angle prism 22 and light-directing means 16. Beam splitting polarizer 16A receives light beam 18 which has its plane of polarization oriented along the Y-axis and transmits light beam 18 unaltered from a face 46A to a right angle prism 22B. Beam splitting polarizer 16A also receives light beam 20 at face 44A which has its plane of polarization oriented along the X-axis. Beam splitting polarizer 16A reflects light beam 20 to right angle prism 22B. Consequently, a light beam 50A is a combination of the intensity of light beams 18 and 20. Light beam 50A is then transmitted to a collimating means 14A by right angle prism 22B. Collimating means 14A may be the same type of device as collimating means 14. From collimating means 14A, the light beam is transmitted via optical fiber 12A to optical detector 52 which detects the presence or absence of light in optical fiber 12A.

On the other hand, if light beam 18 emerging from electro-optic crystal 24 is polarized along the X-axis through the action of electro-optic crystal 24, beam splitting polarizer 16A directs light beam 18 from face 42A to face 48A. If light beam 20 emerging from electro-optic crystal 24 is polarized along the Y-axis through the action of electro-optic crystal 24, beam splitting polarizer 16A directs light beam 20 from face 44A to face 48A. Thus, in this case, light beam 15A contains the full intensity of light beams 18 and 20 while no light emerges from face 46A. Light beam 15A is transmitted to collimating means 14B and optical fiber 12B for detection by optical detector 52A.

Figure 3:
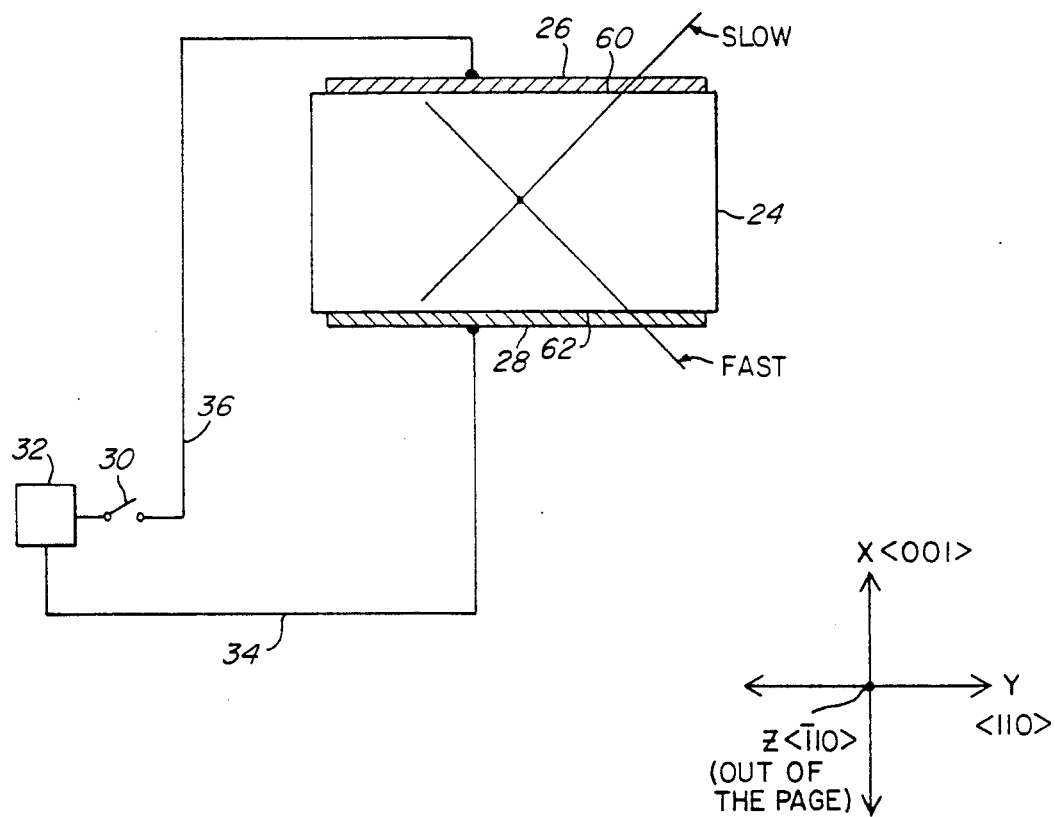
FIG. 3 diagrammatically shows the orientation of the fast and slow optical axes in the electro-optic crystal used in the switch illustrated in FIG. 1.

Reference is now made to FIG. 3, which figure shows the orientation of the fast and slow optical axes for an electric field extending through electro-optic crystal 24 in the <001> direction. Electro-optic crystal 24 has no natural birefringence orthogonal to the direction of light propagation (the <$\bar{1}$10> direction along the Z-axis) and has at least one set of well-defined fast and slow optical axes. Electrodes 26 and 28 are respectively attached to surfaces 60 and 62 of electro-optic crystal 24. Electrodes 26 and 28 may be films of any electrically-conductive substance, such as gold, silver, or copper which may be plated to surfaces 60 and 62 of electro-optic crystal 24. Electro-optic crystal 24 is preferably a parallelepiped crystal.

With an applied electric field, the fast crystal optical axis of electro-optic crystal 24 is oriented at 45° with respect to the <001> crystal direction. The slow crystal optical axis is oriented at 90° with respect to the fast crystal optical axis. In the absence of an electric field, a beam of light polarized so that its plane of polarization is oriented along either the X or Y-axis will pass through electro-optic crystal 24 unaffected. When a voltage is supplied to electrodes 26 and 28, an electric field will be developed across electro-optic crystal 24. This electric field induces birefringence in crystal 24 that changes the plane of polarization of a light beam passing through the crystal along light paths 38 or 40. By employing an electric field of suitable strength, the plane of polarization of a light beam passing through electro-optic crystal 24 can be switched from the X-axis to the Y-axis or from the Y-axis to the X-axis.

The electric field induced birefringence of electro-optic crystal 24 as a function of the applied electric field is given by $$\Gamma(E) = \frac{\pi n_0^3 r_{41} LE}{\lambda} \quad (1)$$

where:
$\lambda$ = the wavelength of the optical source
$n_0$ = crystal index of refraction = 2.07
$r_{41}$ = electro-optic coefficient ($1.03 \times 10^{-12}$ m/V for BGO)
L = crystal length (parallel to <$\bar{1}$10>)
E = the applied electric field strength
for electric fields along the <001> direction.

For an electro-optic crystal with electrodes attached to its surfaces, the applied electric field is given by $$E = V/d \quad (2)$$

where
V = the applied voltage to the electrodes
d = the crystal thickness in the <001> direction Substitution of equation (2) into equation (1) allows the electric field induced birefringence to be expressed in terms of a voltage applied to electrodes directly attached to the electro-optic crystal. A half-wave voltage may then be calculated. The half-wave voltage is defined as the voltage required to induce a birefringence value of $\pi$ which is the degree of phase shift required to switch a plane of polarization of a light beam oriented along the X-axis to a plane of polarization of a light beam oriented along the Y-axis and vice versa.

Using equations (1) and (2), the operation of the optical switch of the present invention is described. Prior to the application of an electric field to electro-optic crystal 24, light will travel from optical fiber 12 through light paths 38 and 40, and optical fiber 12A to optical detector 52 since $\Gamma(E)$, that is the birefringence, equals 0. When a voltage equal to the half-wave voltage is applied to electrodes 26 and 28, $\Gamma(E)$ equals $\pi$ and therefore the plane of polarization of light beam 18 switches from a plane of polarization oriented along the Y-axis to a plane of polarization oriented along the X-axis and the plane of polarization of light beam 20 switches from a plane of polarization oriented along the X-axis to a plane of polarization oriented along the Y-axis. Therefore, all of the light intensity will be transferred from optical fiber 12A to optical fiber 12B. A single-pole double-throw switch is thus created. The half-wave voltage is the switch activation voltage as electro-optic crystal 24 redirects the flow of light from optical fiber 12A to optical fiber 12B.

Figure 4A:
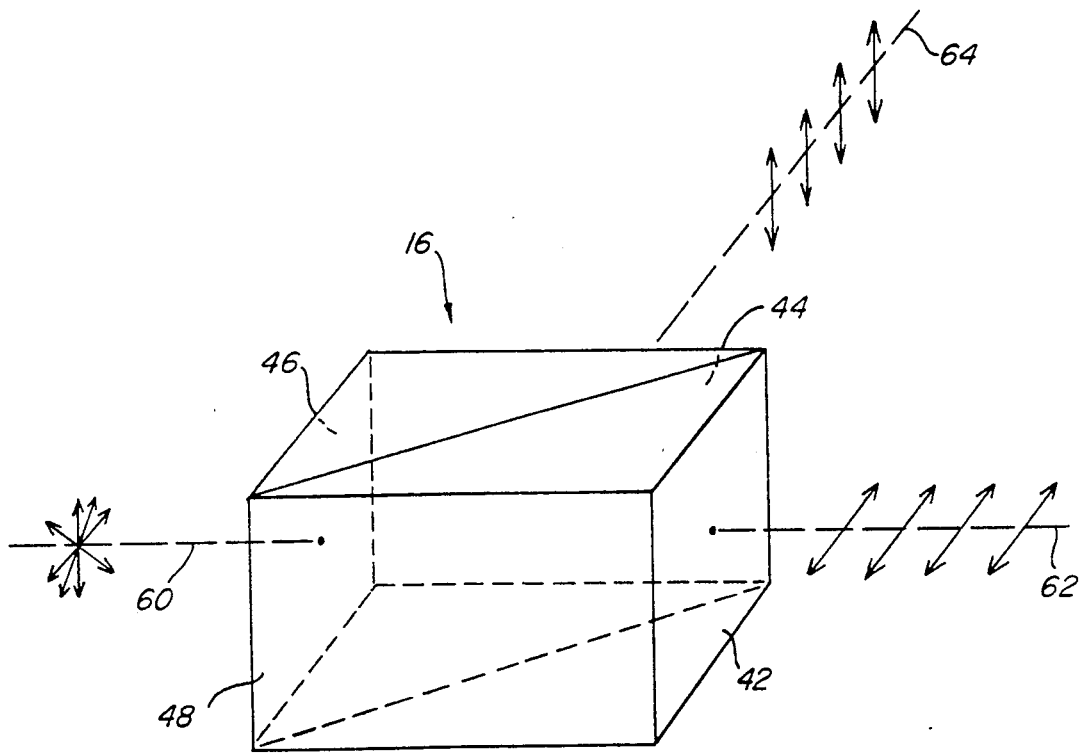
FIG. 4A is a perspective view illustrating how the beam splitting polarizers illustrated in FIGS. 1, 1A, and 2 process a first light beam incident on the beam splitting polarizer.
Figure 4B:
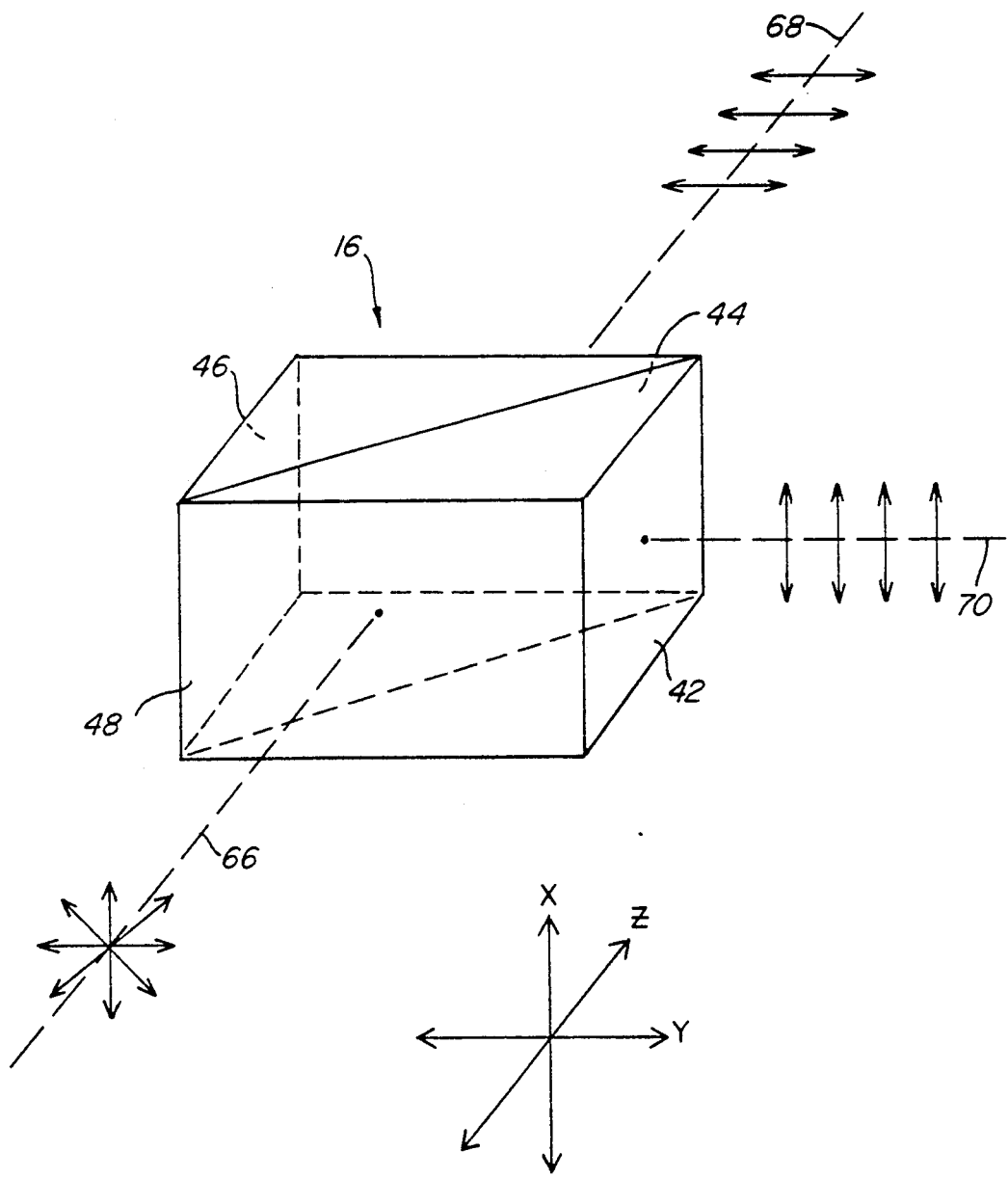
FIG. 4B is perspective view illustrating how the beam splitting polarizers used in the optical switch illustrated in FIGS. 1, 1A, and 2 process a second light beam incident on the beam splitting polarizers.

Reference is now made to FIGS. 4A and 4B, which figures illustrate the operation of the light-directing means 16 and 16A. As noted previously, light-directing means 16 and 16A may be beam splitting polarizers, such as Glan-Taylor prisms. Although FIGS. 4A and 4B specifically illustrate beam splitting polarizer 16, the explanation applies with equal force to beam splitting polarizer 16A.

Referring more specifically to FIG. 4A, a randomly polarized light beam 60 is incident on surface 46 of beam splitting polarizer 16. A portion of a light intensity of light beam 60 having a plane of polarization oriented along the Z-axis in the Y-Z plane is transmitted out of face 42 of beam splitting polarizer 16 and forms light beam 62. Another portion of the intensity of light beam 60 having a plane of polarization oriented along the X-axis in the X-Z plane is transmitted out of face 44 of beam splitting polarizer 16 to form light beam 64. The portion of light beam 60 having a plane of polarization oriented along the Z-axis in the X-Z plane comprises 50% of the input light intensity. The portion of light beam 60 having a plane of polarization oriented along the X-axis in the X-Z plane comprises the remaining 50% of the input intensity of light beam 60. Thus, ignoring insertion losses and losses through beam splitting polarizer 16, substantially 50% of the input light intensity is contained in light beam 62 and substantially 50% of the input light intensity is contained in light beam 64. Thus, substantially 100% of the input light intensity of light beam 60 is transmitted through beam splitting polarizer 16.

Beam splitting polarizer 16 transmits the portion of light beam 60 having a plane of polarization oriented along the Z-axis in the Y-Z plane straight through from face 46 to face 42 without altering a course of the light beam. However, the portion of light beam 60 having a plane of polarization oriented along the X-axis in the X-Z plane has its course altered and is reflected out of face 44 of beam splitting polarizer 16. Beam splitter polarizer 16 thus acts to split a light beam having random polarization into two separate light beams having orthogonally oriented planes of polarization.

The operation of beam splitting polarizer 16 is fully bidirectional. That is, it splits a light beam having random polarization into two light beams having orthogonal planes of polarization, and it also combines two light beams having orthogonal planes of polarization into a single light beam. For example, if light beam 64 having a plane of polarization oriented along the X-axis in the X-Z plane is incident on face 44 and light beam 62 having a plane of polarization oriented along the Z-axis in the Y-Z plane is incident on face 42, beam splitting polarizer 16 combines these two light beams and transmits the combined light beam 60 out of face 46.

Referring more specifically to FIG. 4B, the same beam splitting and beam combining function of beam splitting polarizer 16 is illustrated. In the case illustrated in FIG. 4B, a randomly polarized light beam 66 is incident on face 48 of beam splitting polarizer 16. Fifty percent of an input light intensity of light beam 66 has a plane of polarization oriented along the Y-axis in the X-Y plane and is transmitted straight through beam splitting polarizer 16 and emerges from face 44 as light beam 68. A portion of the input intensity of light beam 66 having a plane of polarization oriented along the X-axis in the X-Y plane has its course altered and is reflected and transmitted out of face 42 as light beam 70. In the same manner, beam splitting polarizer 16 combines light beams having orthogonal planes of polarization such as light beams 68 and 70 incident on respective faces 44 and 42 into a single light beam 66 which emerges from face 48.

From FIGS. 4A and 4B, it is apparent that for the particular orientation of the beam splitting polarizer chosen in the preferred embodiment, beam splitting polarizer 16 transmits a light beam having its plane of polarization oriented along either the Y-axis in the X-Y plane or along the Z-axis in the X-Z plane straight through without altering its course. By contrast, a light beam having a plane of polarization oriented along the X-axis in the X-Z plane or along the X-axis in the X-Y plane has its course of transmission altered to either combine with or be split from the portion of an incident light beam having its plane of polarization oriented along the Y-axis in the X-Y plane or along the Z-axis in the X-Z plane.

Referring to FIGS. 1–4, the overall operation of the optical switch of the present invention will now be explained. A light beam 15 incident on face 48 of beam splitting polarizer 16 is split into two light beams 18 and 20 having orthogonal planes of polarization. Light beam 18 has its plane of polarization oriented along the Y-axis in the X-Y plane while light beam 20 has its plane of polarization oriented along the X-axis in the X-Z plane. In the absence of any electric field in electro-optic crystal 24, light beams 18 and 20 are respectively incident of face 42A and 44A of beam splitting polarizer 16A after undergoing reflection by components 22 and 22A. Beam splitting polarizer 16A combines orthogonally polarized light beams 18 and 20 and transmits the combined light beam 50A out face 46A of beam splitting polarizer 16A. On the other hand, if an electric field of sufficient magnitude (i.e., the voltage between electrodes 26 and 28 is substantially equal to the appropriate half-wave voltage for the wavelength or wavelengths of light being used) is applied across electro-optic crystal 24, light beam 18 experiences a phase shift such that its plane of polarization is switched from the Y-axis to the X-axis. In a like manner, the plane of polarization of light beam 20 is switched from the X-axis to the Y-axis. Beam splitting polarizer 16A combines these light beams into a single light beam and transmits light beam 15A which includes the light intensity of light beams 18 and 20 out through face 48A of beam splitting polarizer 16A.

Since substantially 50% of the input light intensity is contained in light beam 18 and substantially 50% of the input light intensity is contained in light beam 20, substantially 100% of the input light intensity incident on face 48 of beam splitting polarizer 16 emerges from either face 46A or face 48A of beam splitting polarizer 16A. Consequently, the optical switch of the present invention transmits substantially 100% of the input light intensity from input to output, dramatically reducing the light loss through the switch.

Furthermore, the optical switch of the present invention is fully bidirectional or reversible so that a light beam incident on face 48A of beam splitting polarizer 16A emerges at face 48 or 46 beam splitting polarizer 16 in exactly the same manner. Consequently, the optical switch of the present invention is completely optically reversible while at the same time having reduced light loss through the switch.

Using the basic concept of the present invention, several different switch configurations can be constructed. A single-pole, double-throw optical switch can be constructed using beam splitting polarizer 16, right angle prism 22, electro-optic crystal 24, right angle prism 22A, beam splitting polarizer 16A, and right angle prism 22B. A single-pole, single-throw switch can be constructed using beam splitting polarizer 16, right angle prism 22, electro-optic crystal 24, right angle prism 22A, and beam splitting polarizer 16A only.

Furthermore, a double-pole, double-throw switch may be constructed by adding an additional right angle prism 22C, grin-rod lens 14C, optical fiber 12C, and light source 11C. Using this configuration, a fully bidirectional sequentially operated double-pole, double-throw switch having reduced light loss is achieved. A light beam incident on face 48 of beam splitting polarizer 16 is switched between faces 48A and 46A of beam splitting polarizer 16A. In the same manner, a light beam 50 incident on face 46 of beam splitting polarizer 16 is switched between face 48A and 46A of beam splitting polarizer 16. The operation of the switch is fully reversible and face 48A and 46A may serve as the input to the switch. At one point in time therefore, the optical switch switches a light beam incident on face 48, while at another point in time, the optical switch switches a light beam incident on face 46 of beam splitting polarizer 16. Obviously, with this construction, double-pole switching is achieved when the switch switches the light beams in a sequential manner.

Figure 1A:
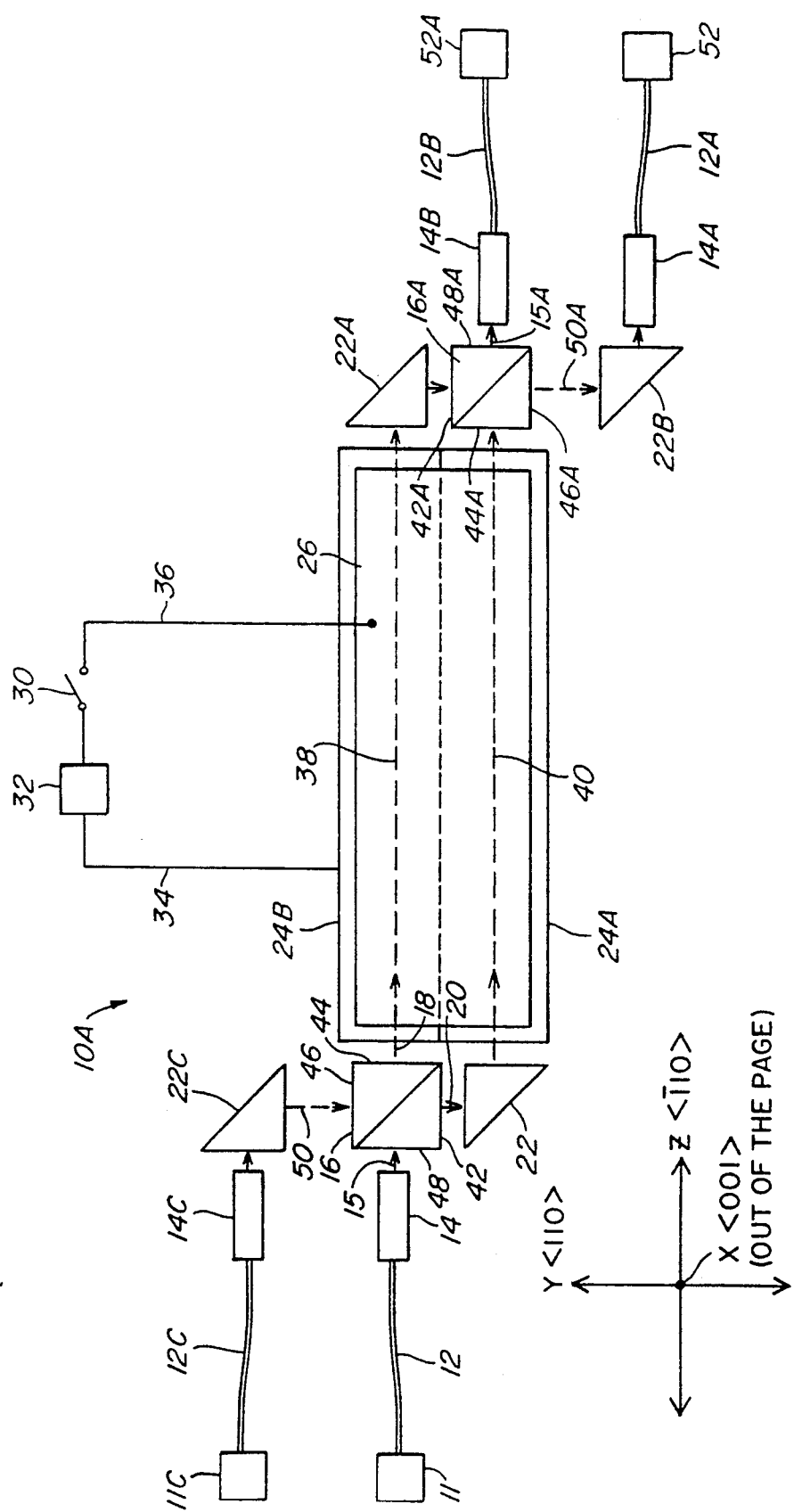
Figure 3A:
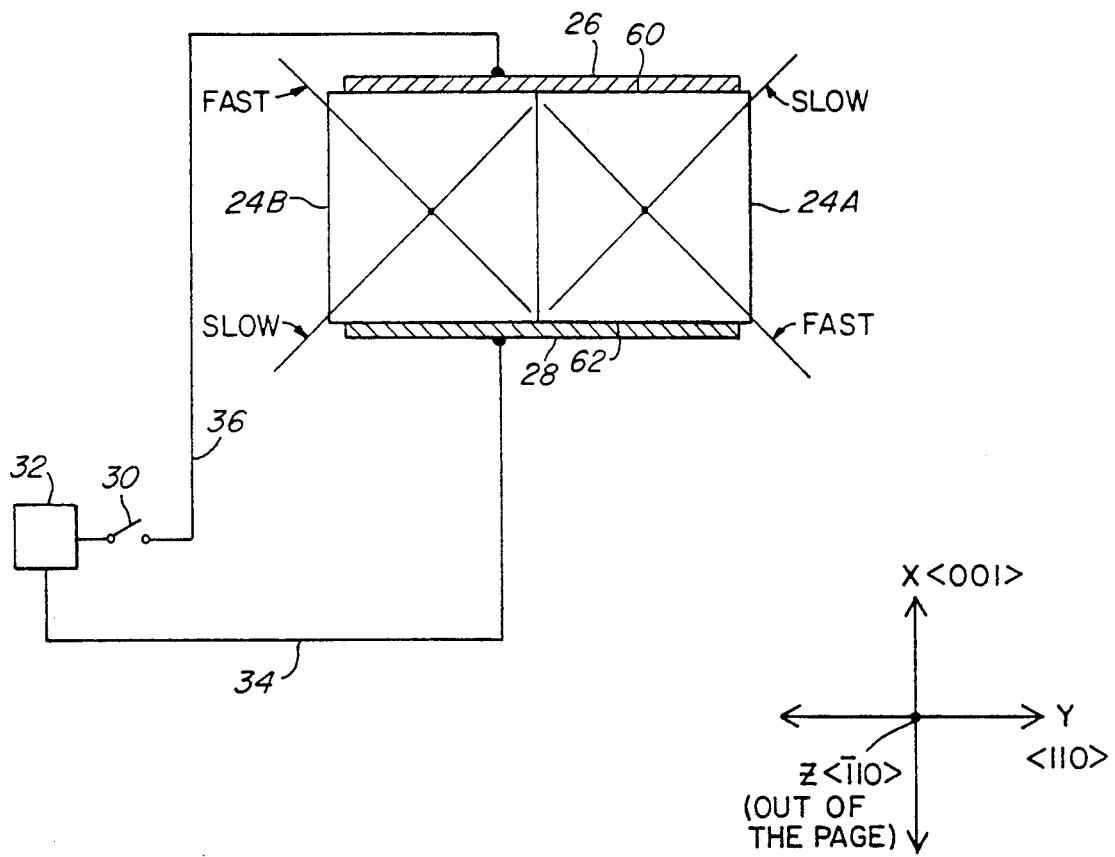
FIG. 3A diagrammatically shows the orientation of the fast and slow optical axes in the electro-optic crystal used in the optical switch illustrated in FIG. 1A.

Reference is now made to FIGS. 1A and 3A which illustrate an alternate embodiment 10A of the optical switch of the present invention. As shown in FIG. 1A, two electro-optic crystals 24A and 24B may be readily substituted for the single electro-optic crystal 24 illustrated in FIG. 1. Otherwise, the operation of the switch is the same as previously described.

One skilled in the art will appreciate that the orientation of the components illustrated in FIGS. 1-4 is merely an example and is not limiting of the invention. The optical components may be oriented so that the various planes of polarization occur along different crystal directions and the orientation of the electro-optic crystal may be chosen such that its fast and slow optical axes are oriented along different crystal directions as well. For example, the orientations of the optical components may be chosen to be that shown in the '824 patent. Furthermore, electro-optic crystals having more than one set of fast and slow optical axes can be used in the present invention by orienting the optical components to use only one of the sets of fast and slow optical axes.

Additionally, light sources 11 and 11C may be combined into a single light source. Optical detectors 52 and 52A may be combined into a single optical detector. One skilled in the art will appreciate that right angle prisms 22, 22A, 22B, and 22C are included in a preferred embodiment to reduce the physical size of the optical switch only and are not necessary to the operation of the invention. Furthermore, these right angle prisms may be replaced by any other component capable of reflecting the light beams through an angle.

Having thus described one particular embodiment of the invention, various alterations, modifications, and improvements will readily occur to those skilled in the art. For example, the modifications described in the '824 patent to decrease the required activation voltage are clearly included within the scope of the present invention. Such alterations, modifications, and improvements as are made obvious by this disclosure are intended to be part of this disclosure although not expressly stated herein and are intended to be within the spirit and scope of the invention. Accordingly, the foregoing description is by way of example only and is not intended as limiting. The invention is limited only as defined in the following claims and the equivalents thereto.

What is claimed is:

1. An optically bidirectional electrically-controlled optical switch comprising:

at least one electro-optic crystal having one set of fast and slow optical axes, two ends, and two light paths extending through the at least one crystal from one of the two ends to the other of the two ends, the at least one electro-optic crystal exhibiting electric field induced birefringence such that a light beam passing through the at least one crystal along a light path and having a plane of polarization oriented in a first direction may have its plane of polarization switched from the first direction to a plane of polarization oriented in a second direction;

a beam splitting polarizer, disposed at each of the two ends and optically aligned with the two light paths, combining two light beams having planes of polarization oriented in the first and second directions into a single beam of light when receiving light beams from the two light paths and splitting a single beam of light into two light beams having planes of polarization oriented in the first and second directions when transmitting light to the two light paths;

wherein the fast and slow optical axes are orthogonal to each other;

wherein the first and second directions are parallel to each other;

wherein the at least one electro-optic crystal is a rectangular parallelepiped crystal wherein the two light paths extend through the at least one electro-optic crystal parallel to each other along a $<\bar{1}10>$ crystal direction;

wherein the fast optical axis is disposed at $\pi/4$ with respect to a $<100>$ crystal direction;

wherein the slow optical axis is disposed at $\pi/4$ with respect to a $<110>$ crystal direction;

wherein the planes of polarization corresponding to the first and second directions are disposed at $\pi/4$ with respect to the fast and slow optical axes;

a first right angle prism, disposed between one of the beam splitting polarizers and one of the light paths, directing a light beam from the beam splitting polarizer to one of the light paths of the at least one electro-optic crystal or from one of the light paths of the at least one electro-optic crystal to the beam splitting polarizer;

a second right angle prism, disposed between the other beam splitting polarizer and the other one of the light paths, directing a light beam from the other beam splitting polarizer to the other light path of the at least one electro-optic crystal or from the other light path of the at least one electro-optic crystal to the other beam splitting polarizer;

a third right angle prism directing a light beam to or from one of the beam splitting polarizers;

a fourth right angle prism directing a light beam to or from the other one of the beam splitting polarizers; and light transmission means for coupling light to the two beam splitting polarizers, the third right angle prism, and the fourth right angle prism.

2. The optical switch of claim 1, further comprising means for establishing an electric field with the at least one electro-optic crystal within the influence of the established electric field.

3. The optical switch of claim 2, wherein the means for establishing the electric field includes electrodes disposed on at least one surface of the at least one electro-optic crystal.

4. The optical switch of claim 1, wherein the beam splitting polarizers comprise Glan-Taylor prisms.

5. The optical switch of claim 4, wherein the light transmission means comprises optical fiber means.

6. The optical switch of claim 5, wherein the collimating means comprises a grin-rod lens.

7. The optical switch of claim 1, further comprising collimating means for mechanically and optically coupling the light transmission means to the two beam splitting polarizers, the third right angle prism, and the fourth right angle prism.

8. The optical switch of claim 1, wherein the at least one electro-optic crystal is a cubic crystal.

9. The optical switch of claim 1, wherein the at least one electro-optic crystal is a member of the $\bar{4}3m$, $\bar{4}2m$, or 23 crystal classes.

10. The optical switch of claim 1, wherein the at least one electro-optic crystal is a bismuth germanium oxide crystal.

11. The optical switch of claim 1, wherein the at least one electro-optic crystal is a bismuth silicon oxide crystal.

* * * * *